ately decrease its tensile strength. This scoring does not appreciably reduce the friction driving surface upon the belt edges, but increases the flexibility to more than overcome the disadvantages of the excess thickness. The screws D' effectively retain the plies together, and are so disposed in the belting as to be arranged one for each section intermediate the scores, as illustrated in Fig. 1.

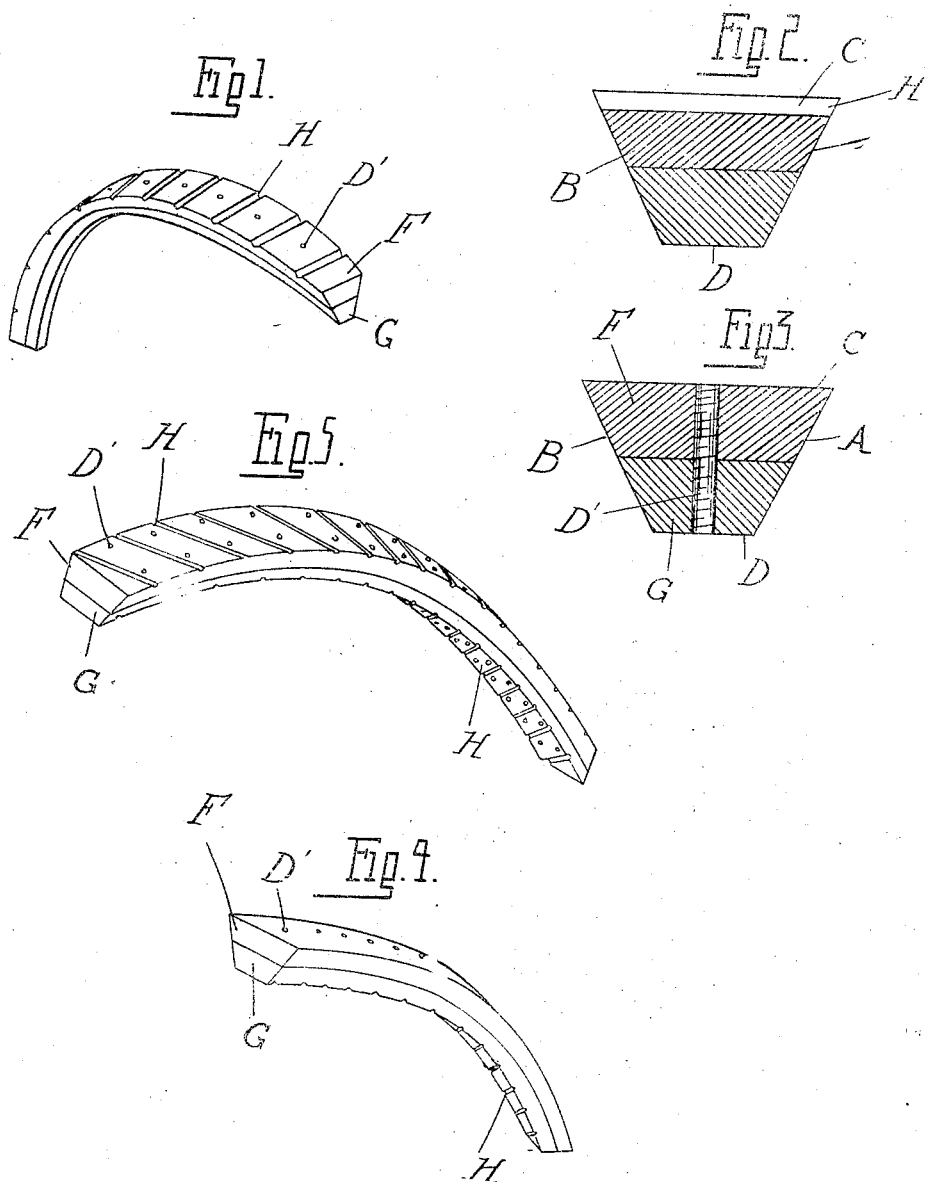

UNITED STATES PATENT OFFICE.

AUGUST G. KOLBE, OF DETROIT, MICHIGAN, ASSIGNOR TO DETROIT OAK BELTING COMPANY, OF DETROIT, MICHIGAN, A CORPORATION OF MICHIGAN.

DRIVE-BELT.

941,766.

Specification of Letters Patent.

Patented Nov. 30, 1909.

Application filed January 9, 1908. Serial No. 471,457.

*To all whom it may concern:*

Be it known that I, AUGUST G. KOLBE, a citizen of the United States of America, residing at Detroit, in the county of Wayne and State of Michigan, have invented certain new and useful Improvements in Drive-Belts, of which the following is a specification, reference being had therein to the accompanying drawings.

The invention relates generally to leather drive belts, and more particularly to a construction of belt designed for use in connection with grooved pulleys.

The invention consists in the construction of the belt, in the peculiar arrangement and combination of its parts, and in certain details of construction as will be more fully hereinafter set forth.

In the drawings, Figure 1 is a perspective view of a length of belting made in accordance with my invention; Fig. 2 is an enlarged cross section thereof; Fig. 3 is a similar section taken in the plane of the fastening means; and Figs. 4 and 5 are perspective views illustrating modifications in the belt formation.

To permit the belt to properly engage the grooved pulley, it is made in substantially wedge-shaped cross section as shown, the side edges A B constituting the friction drive surfaces and the top and bottom portions C D respectively the belt faces—as they will be hereinafter termed.

To provide the requisite amount of friction surface the belt is made of considerable thickness, and to produce this a number of plies of leather are employed,—two in this instance being shown,—F representing the outer ply and G the inner ply. These plies are cemented together, and are preferably further secured to each other by metallic screws D' which extend preferably from the outer to the inner faces of the belt.

While the multiple construction affords the desired amount of friction drive surface for the belt, the abnormal thickness tends to make the belt stiff, and thereby materially reduces its flexibility. To obviate this defect, and at the same time retain the full amount of friction surface, one of the belt faces is formed with a series of transverse scores or grooves H, which cut through the smooth surface of the belt skin but do not extend sufficiently into the hide to materially decrease its tensile strength. This scoring does not appreciably reduce the friction driving surface upon the belt edges, but increases the flexibility to more than overcome the disadvantages of the excess thickness. The screws D' effectively retain the plies together, and are so disposed in the belting as to be arranged one for each section intermediate the scores, as illustrated in Fig. 1.

The two or more plies of leather that form the belting are placed with the flesh side of the leather in contact.

In Fig. 1 I have shown the scoring formed in the outer face of the leather, but it will be understood that the inner may be scored only, or both faces may be scored if desired where the thickness of the belt makes it necessary.

In Fig. 4 the belting is shown with a scoring upon the under face, and the scores extend obliquely from one edge to the other. This is desirable, as it materially reduces the tendency of the belt to break by reason of the scoring.

In Fig. 5 the belting is shown as scored both upon the outer and inner faces, the scoring being oblique to the faces and the series of scores or grooves upon one face being arranged at an angle to those upon the opposite face, this feature of construction being a further safeguard against possible breaking or cracking.

What I claim as my invention is,—

1. A drive belt having a transversely scored outer face.

2. A drive belt having a transversely scored outer face and friction drive surfaces upon its opposite sides or edges.

3. A drive belt formed of a plurality of plies of leather secured to each other, the outer ply being transversely scored on its outer face.

4. A drive belt comprising a plurality of plies of leather cemented to each other, the opposite edges of said plies forming friction drive surfaces and the outer face of an external ply being transversely scored, and metallic auxiliary securing means for the plies intermediate the scores.

5. A drive belt composed of a plurality of plies of leather secured to each other with the flesh sides of the leather in contact, the outer face of an external ply being transversely scored.

6. A drive belt having friction drive surfaces upon opposite edges thereof, and the outer face of an external ply scored transversely at a plurality of points distributed longitudinally of the belt.

7. A drive belt composed of a plurality of plies of leather secured to each other with the flesh sides of the leather in contact, the opposite edges of said plies forming the friction drive surfaces and the outer face of an external ply being scored transversely.

8. A drive belt having its outer and inner faces scored transversely, the scores or grooves extending obliquely from side to side, and the scores upon one face extending at an angle to the scores upon the opposite face.

9. A drive belt comprising a plurality of plies of leather secured to each other, the opposite edges of said plies forming friction drive surfaces, and one of the belt faces being transversely scored, the depth of the scores being less than the thickness of one of the plies.

10. A drive belt comprising a plurality of plies of leather secured to each other, the opposite edges of said plies forming friction drive surfaces, and one of said plies being scored transversely for its entire width.

In testimony whereof I affix my signature in presence of two witnesses.

AUGUST G. KOLBE.

Witnesses:
JAMES P. BARRY,
W. J. BELKNAP.